US008667136B2

(12) United States Patent
Madanes et al.

(10) Patent No.: US 8,667,136 B2
(45) Date of Patent: Mar. 4, 2014

(54) COMMUNICATION SYSTEM

(75) Inventors: Rodrigo Madanes, London (GB); Natasha Valerie Sopieva, St. Albans (GB); Linus Nilsson, Skellefteå (SE); Nick Corr, London (GB)

(73) Assignee: Skype, Dublin (IE)

( * ) Notice: Subject to any disclaimer, the term of this patent is extended or adjusted under 35 U.S.C. 154(b) by 1200 days.

(21) Appl. No.: 11/999,728

(22) Filed: Dec. 6, 2007

(65) Prior Publication Data

US 2008/0182555 A1    Jul. 31, 2008

(30) Foreign Application Priority Data

Dec. 8, 2006 (GB) .................................. 0624577.3
Feb. 20, 2007 (GB) .................................. 0703274.1

(51) Int. Cl.
*G06F 15/173* (2006.01)

(52) U.S. Cl.
USPC ........... 709/226; 709/201; 709/205; 709/212; 709/216; 709/217; 709/225; 709/229; 709/246; 709/248; 707/610; 707/640; 707/694; 707/758; 707/781

(58) Field of Classification Search
USPC ......... 709/212, 216, 217, 225, 229, 246, 248, 709/201, 205, 226; 707/610, 640, 694, 758, 707/781, 783
See application file for complete search history.

(56) References Cited

U.S. PATENT DOCUMENTS

| | | | |
|---|---|---|---|
| 5,355,474 A * | 10/1994 | Thuraisngham et al. ..... | 707/759 |
| 5,581,749 A * | 12/1996 | Hossain et al. ....................... | 1/1 |
| 5,623,659 A * | 4/1997 | Shi et al. ............................... | 1/1 |
| 5,815,665 A * | 9/1998 | Teper et al. .................... | 709/229 |
| 5,940,843 A * | 8/1999 | Zucknovich et al. ......... | 715/210 |
| 6,073,138 A * | 6/2000 | de l'Etraz et al. ............. | 707/748 |
| 6,105,027 A * | 8/2000 | Schneider et al. ................... | 1/1 |
| 6,173,326 B1 * | 1/2001 | Collins ......................... | 709/229 |
| 6,260,148 B1 | 7/2001 | Aggarwal et al. | |
| 6,279,001 B1 * | 8/2001 | DeBettencourt et al. ............. | 1/1 |
| 6,324,538 B1 * | 11/2001 | Wesinger et al. ..................... | 1/1 |

(Continued)

FOREIGN PATENT DOCUMENTS

WO    WO 2005/009019 A2    1/2005

OTHER PUBLICATIONS

International Search Report for PCT/IB2007/004378, date of mailing Oct. 7, 2008.

(Continued)

*Primary Examiner* — Michael Y Won
(74) *Attorney, Agent, or Firm* — Sonia Cooper; Jim Ross; Micky Minhas

(57) ABSTRACT

A method of updating a data record stored in a data store with information supplied by at least one of a plurality of users of a communication network includes storing a communication identifier in association with the data record; providing information to update the data record from a user together with a communication identifier associated with the user providing the information; and comparing the identifier stored in association with the data record to the communication identifier associated with the user providing the information. If the information is the first type of information, the data record is updated with the information only if the identifier associated with the user providing the information is the same as the identifier stored in association with the data record and if the information is the second type of information the data record is updated with the information.

10 Claims, 14 Drawing Sheets

(56) References Cited

U.S. PATENT DOCUMENTS

| | | | |
|---|---|---|---|
| 6,408,336 B1* | 6/2002 | Schneider et al. | 709/229 |
| 6,564,264 B1* | 5/2003 | Creswell et al. | 709/245 |
| 6,587,836 B1* | 7/2003 | Ahlberg et al. | 705/26.35 |
| 6,615,258 B1* | 9/2003 | Barry et al. | 709/223 |
| 6,618,806 B1* | 9/2003 | Brown et al. | 713/186 |
| 6,785,728 B1* | 8/2004 | Schneider et al. | 709/229 |
| 6,813,633 B2* | 11/2004 | Wong et al. | 709/217 |
| 6,889,246 B1* | 5/2005 | Kawamoto et al. | 709/204 |
| 7,003,576 B2* | 2/2006 | Bjornestad et al. | 709/229 |
| 7,206,936 B2* | 4/2007 | Aull et al. | 713/173 |
| 7,221,748 B1 | 5/2007 | Moore et al. | |
| 7,287,227 B2* | 10/2007 | Ries et al. | 715/741 |
| 7,305,421 B2* | 12/2007 | Cha et al. | 1/1 |
| 7,344,068 B2* | 3/2008 | Register et al. | 235/382 |
| 7,434,257 B2* | 10/2008 | Garg et al. | 726/21 |
| 7,457,832 B2* | 11/2008 | Baird et al. | 1/1 |
| 7,552,467 B2* | 6/2009 | Lindsay | 726/5 |
| 7,571,197 B2* | 8/2009 | Christensen et al. | 1/1 |
| 7,620,630 B2* | 11/2009 | Lloyd et al. | 1/1 |
| 7,698,445 B2* | 4/2010 | Fitzpatrick et al. | 709/229 |
| 7,702,753 B2* | 4/2010 | Simongini et al. | 709/219 |
| 7,711,749 B2* | 5/2010 | Brodie et al. | 707/783 |
| 7,903,637 B2* | 3/2011 | Moore et al. | 370/352 |
| 7,958,144 B2* | 6/2011 | Shoemaker et al. | 707/781 |
| 8,065,345 B2* | 11/2011 | Robertson et al. | 707/805 |
| 2002/0010679 A1* | 1/2002 | Felsher | 705/51 |
| 2002/0040401 A1* | 4/2002 | Yasushi et al. | 709/229 |
| 2002/0083059 A1* | 6/2002 | Hoffman et al. | 707/9 |
| 2002/0110225 A1 | 8/2002 | Cullis | |
| 2002/0156797 A1* | 10/2002 | Lee et al. | 707/200 |
| 2002/0194165 A1 | 12/2002 | Smith | |
| 2003/0032409 A1 | 2/2003 | Hutcheson et al. | |
| 2003/0050977 A1 | 3/2003 | Puthenkulam et al. | |
| 2003/0078981 A1 | 4/2003 | Harms et al. | |
| 2003/0115466 A1* | 6/2003 | Aull et al. | 713/172 |
| 2003/0147518 A1 | 8/2003 | Albal et al. | |
| 2003/0179866 A1 | 9/2003 | Stillman et al. | |
| 2003/0212615 A1* | 11/2003 | Whitehead et al. | 705/30 |
| 2004/0025048 A1* | 2/2004 | Porcari et al. | 713/200 |
| 2004/0057415 A1 | 3/2004 | Colson et al. | |
| 2004/0110497 A1 | 6/2004 | Little | |
| 2004/0128151 A1 | 7/2004 | Mock et al. | |
| 2004/0146150 A1 | 7/2004 | Barnes et al. | |
| 2004/0151300 A1 | 8/2004 | Marwell et al. | |
| 2004/0258054 A1 | 12/2004 | Kurganov | |
| 2005/0032527 A1 | 2/2005 | Sheha et al. | |
| 2005/0080859 A1 | 4/2005 | Lake | |
| 2005/0182837 A1 | 8/2005 | Harris et al. | |
| 2005/0232247 A1 | 10/2005 | Whitley et al. | |
| 2005/0249196 A1 | 11/2005 | Ansari et al. | |
| 2006/0052091 A1 | 3/2006 | Onyon et al. | |
| 2006/0095795 A1* | 5/2006 | Nakamura et al. | 713/193 |
| 2006/0154658 A1 | 7/2006 | Holder et al. | |
| 2006/0161977 A1* | 7/2006 | Jung et al. | 726/21 |
| 2006/0239279 A1 | 10/2006 | Classen et al. | |
| 2007/0053335 A1 | 3/2007 | Onyon et al. | |
| 2007/0162450 A1* | 7/2007 | Siress et al. | 707/9 |
| 2007/0238451 A1 | 10/2007 | Borzsei | |
| 2007/0259654 A1 | 11/2007 | Oijer | |
| 2007/0266118 A1 | 11/2007 | Wilkins | |
| 2008/0057926 A1 | 3/2008 | Forstall et al. | |
| 2008/0133543 A1* | 6/2008 | Fu et al. | 707/10 |
| 2008/0181199 A1 | 7/2008 | Madanes et al. | |
| 2008/0212748 A1 | 9/2008 | Stillman et al. | |
| 2008/0219416 A1 | 9/2008 | Roujinsky | |

OTHER PUBLICATIONS

International Search Report and Written Opinion, PCT/IB2007/004416, date of mailing Mar. 27, 2009.

International Search Report and Written Opinion, PCT/IB2007/004378, date of mailing Jan. 14, 2009.

"Non-Final Office Action", U.S. Appl. No. 11/999,730, (Aug. 5, 2011), 20 pages.

"Non-Final Office Action", U.S. Appl. No. 11/999,730, (Feb. 15, 2012), 24 pages.

"Final Office Action", U.S. Appl. No. 11/999,730, (Aug. 31, 2012), 33 pages.

"Advisory Action", U.S. Appl. No. 11/999,730, (Nov. 6, 2012), 3 pages.

"Non-Final Office Action", U.S. Appl. No. 11/999,730, (Aug. 16, 2013), 36 pages.

* cited by examiner

Fig. 11

Skype™ SkypeFind

Search

United Kingdom ▶

What?
Bank

Where?
London

[Search]

✻ My SkypeFind    3
● From my friends    15
❓ Community requests    215

✻ Add a listing
● Ask your friends

User Guide About SkypeFind.

---

⬆⬇ Review Citibank                                   Sort by [Highest rating ▶]

✻ This listing has been claimed by the business owner and cannot be edited. Everybody can still write reviews. If you encounter problems with the contact details, please report a concern.

*Rating:    ○✻ Really good    ○✻ Good    ○✤ Not so good
              30              31              32

Comments:   ⊙ Emoticons   A Setfont   🔲 SkypeFindlink   ⊙ Weblink

[                                                    ]
Let others know what you think about this business 🔲 Your name is recorded with the review and will appear next to it

*indicates required information                  [Add]  [Cancel]
                                                    35

34

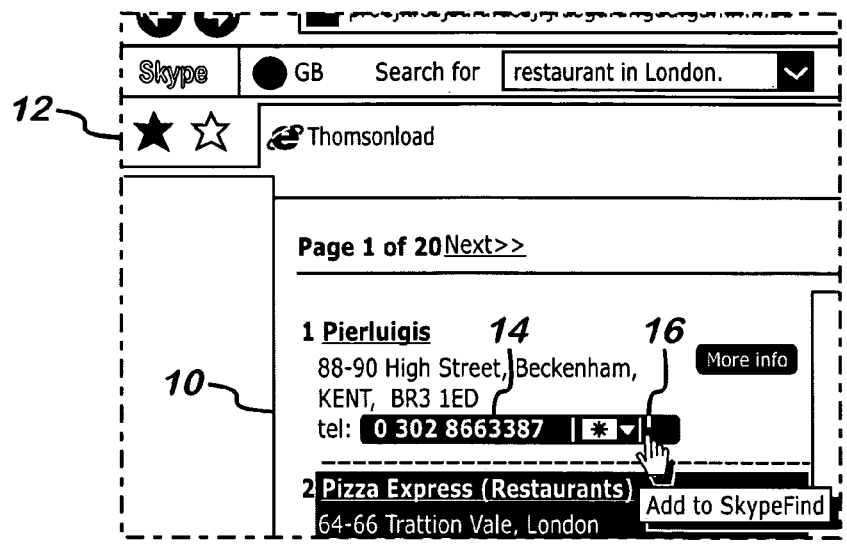
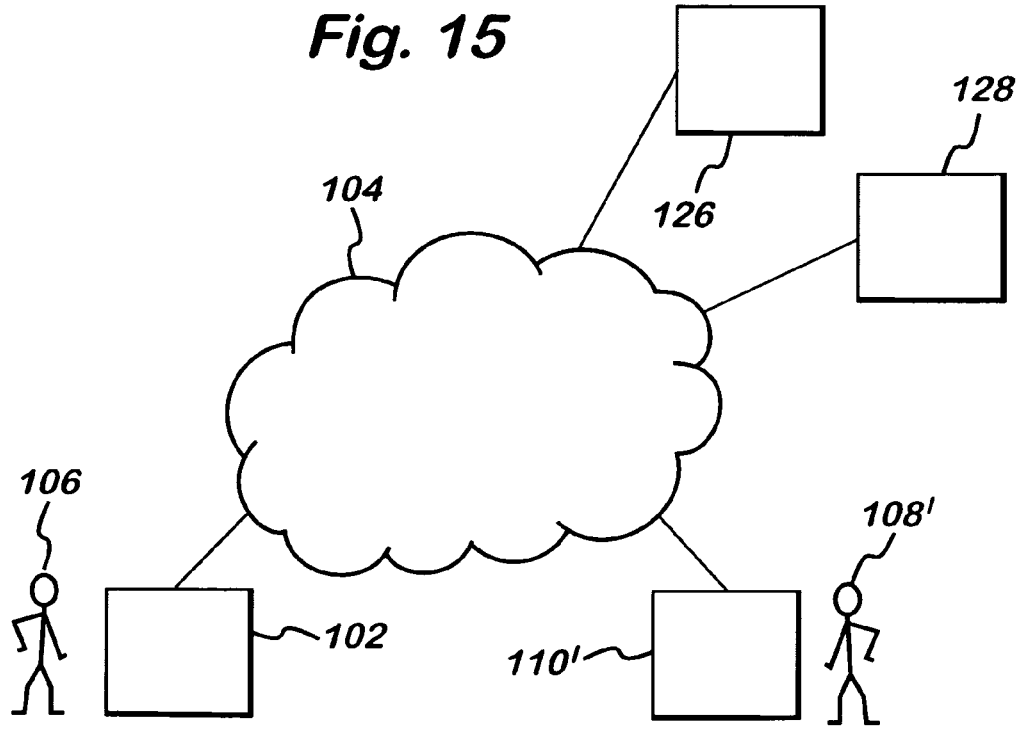

COMMUNICATION SYSTEM

RELATED APPLICATIONS

This application claims priority under 35 U.S.C. §119 or 365 to Great Britain Application No. 0624577.3, filed Dec. 8, 2006 and Great Britain Application No. 0703274.1, filed Feb. 20, 2007. The entire teachings of the above applications are incorporated herein by reference.

TECHNICAL FIELD

The present invention relates to a method and system for storing data relating to a called party in a communication system. In particular the invention relates, but not exclusively to storing and searching for data relating to a party that may be called in a communication system.

BACKGROUND

In a communication system a method for communication is provided, which can connect two communication terminals so that the terminals can send information to each other in a call or other communication event. Information may include voice, text, images or video.

Protocols which are used to carry voice signals over the internet are commonly referred to as Voice over Internet Protocol (VoIP) and may also be referred to as Voice over Broadband. VoIP is the protocol used for routing of voice conversations over the Internet or through any other IP-based network.

One such communication system to use VoIP is a peer to peer communication system, in which a plurality of end users can be connected for communication purposes via a communications structure such as the internet. A peer to peer network may also use other protocols to facilitate the transfer of other data such as text images or video. The communications structure is substantially decentralised with regard to communication route switching therein for connecting the end users. That is, the end users can establish their own communication routes through the structure based on exchange of one or more authentication certificates (user identity certificates—UIC) to acquire access to the structure. The structure includes an administration arrangement issuing the certificates to the end users. Such a communication system is described in WO 2005/009019.

In a communication system, such as a peer to peer system, client software is installed on end user devices such as personal computers (PCs) to allow the end users to communicate via the communications network. The user interface of the client software can be controlled by the client to display user facilities and to indicate events occurring, such as an incoming call.

When making a voice call or setting up another type of communication with a user device the user may either manually input a number identifying the called party or recall a number that has been pre-stored in a list of contacts on the client by the user. If the user does not know the number it is necessary for the user to look up the number possibly using a number look up service before initiating the call.

Directories on the internet currently exist that allow a user to search for a number of a party the user wishes to contact using search terms input by the user. Such directories require the user to manually input information to search the directory. If the directory does not contain the information the user requires the user must refer to a different directory or input different search terms.

It is necessary to use the correct search terms to identify a listing on the directory. This may be problematic for the user. If the user is unfamiliar with searching using an internet directory the user may input search terms which will not provide the user with the desired results.

Furthermore the information provided on the directory may be incorrect. This is problematic for both a user wishing to contact a party listed on the directory and also for the listed party. For example, if the party is a business, incorrect contact details will result in a party losing business that could be generated via the listing on the directory.

It is therefore an aim of embodiments of the invention to address at least one of the above identified problems.

SUMMARY

According to a first aspect of the present invention there is provided a method of updating a data record stored in a data store with information supplied by at least one of a plurality of users of a communication network, said data record comprising a first type of information and a second type of information; each of said users having an associated communication identifier identifying an endpoint in the communication network for receiving a communication event, said method comprising; storing a communication identifier in association with the data record; providing information to update the data record from a user together with a communication identifier associated with the user providing the information; comparing the identifier stored in association with the data record to the communication identifier associated with the user providing the information; wherein if the information is the first type of information, the data record is updated with the information only if the identifier associated with the user providing the information is the same as the identifier stored in association with the data record and wherein if the information is the second type of information the data record is updated with the information.

According to a second aspect of the present invention there is provided a method of updating a data store with information identifying users capable of communicating in a communication network, said method comprising; receiving from a first user a first set of information to search the data store; searching the data store with the first set of information; providing the first user with means to post the first set of information on a request page if the first set of information does not match any data stored in the data store, wherein the first information is posted in the form of a request; storing the request in association with a request identifier associated with the first user; receiving from a second user a second set of information in response to the request; transmitting the second set of information together with the request identifier to the data store; storing the second set of information in the data store; identifying the first user from the request identifier; and notifying the first user of the second set of information stored in the data store.

According to a third aspect of the present invention there is provided a method of searching a data store for information relating to a recipient device capable of receiving a communication event in a communications network, the method comprising: processing information at a user terminal in the communications network to carry out a first action that is unrelated to searching the data store, wherein said information comprises an identifier for the recipient device; detecting the identifier for the recipient device in response to processing the information; searching the data store with the identifier of the recipient device for information relating to the recipient device; transmitting information relating to the recipient device to the user terminal; and displaying the information relating to the recipient device to the user of the user terminal.

According to a fourth aspect of the present invention there is provided a method of searching a data store for information relating to a plurality of recipient devices, the method comprising: establishing a communication event with a recipient device identified on a document by an initiator device; searching the document for character strings that satisfy a predetermined criteria in response to establishing the communication event; searching the data store with at least one of said character strings that satisfy the criteria; identifying information associated with at least one of said plurality of recipient devices, using the at least one character string; transmitting the information associated with the at least one of said recipient devices to the initiator device; and displaying the information relating to the recipient device to a user of the initiator device.

According to a fifth aspect of the present invention there is provided a communication network arranged to update a data record stored in a data store with information supplied by at least one of a plurality of users of the communication network, said data record comprising a first type of information and a second type of information; each of said users having an associated communication identifier identifying an endpoint in the communication network for receiving a communication event, said communication network comprising: the data store, wherein the data store is arranged to store a communication identifier in association with the data record; and wherein said communication network further comprises; a first user device arranged to provide information to update the data record from a user together with a communication identifier associated with the user providing the information; wherein the data store is arranged to compare the identifier stored in association with the data record to the communication identifier associated with the user providing the information; and wherein if the information is the first type of information, the data store is arranged to update the data record with the information only if the identifier associated with the user providing the information is the same as the identifier stored in association with the data record and wherein if the information is the second type of information the data store is arranged to update the data record with the information.

According to a sixth aspect of the present invention there is provided a communication network arranged to update a data store with information identifying users capable of communicating in a communication network, said communication network comprising; the data store, wherein the data store is arranged to store data records associated with users capable of communicating in the communication network; to receive from a first device a first set of information to search the data store; and to transmit a response to the first user device indicating that the first set of information did not identify any users capable of communicating in the communication network if the first set of information does not match any of the stored data records; and wherein the communication network further comprises; the first device, wherein the first device is arranged to provide a user of the first device with means to post the first set of information on a request page in response to receiving the response indicating that the first set of information did not identify any users, wherein the first information is posted in the form of a request; a request storage arranged to store the request in association with a request identifier associated with the first user; to receive from a second user a second set of information in response to the request and to transmit the second set of information together with the request identifier to the data store; to identify the first user from the request identifier; and to notify the first user of the second set of information stored in the data store.

According to a seventh aspect of the present invention there is provided a communication network arranged to search a data store for information relating to a recipient device capable of receiving a communication event in a communications network, the communication network comprising: a user terminal arranged to process information to carry out a first action that is unrelated to searching the data store, wherein said information comprises an identifier for the recipient device; to detect the identifier for the recipient device in response to processing the information; and to transmit to the data store a message to search the data store with the identifier of the recipient device for information relating to the recipient device; to receive information transmitted from the data store relating to the recipient device; and to display the information relating to the recipient device.

According to an eighth aspect of the present invention there is provided a communication network arranged to search a data store for information relating to a plurality of recipient devices, the network comprising: an initiator device arranged to establish a communication event with a recipient device identified on a document, to search the document for character strings that satisfy a predetermined criteria in response to establishing the communication event; and to transmit a message to the data store to search the data store with at least one of said character strings that satisfy the criteria; to receive information transmitted from the data store associated with at least one of said plurality of recipient devices, identified using the at least one character string and to display the information relating to the recipient device to a user of the initiator device.

According to a ninth aspect of the present invention there is provided a device arranged to communicate with a data store in a communication network comprising; call establishing means arranged to establish a communication event with a recipient device identified on a document, searching means arranged to search the document for character strings that satisfy a predetermined criteria in response to establishing the communication event; transmitting means arranged to transmit a message to the data store to search the data store with at least one of said character strings that satisfy the criteria; receiving means arranged to receive information transmitted from the data store associated with at least one of said plurality of recipient devices, identified using the at least one character string; and display means to display the information relating to the recipient device to a user of the initiator device.

BRIEF DESCRIPTION OF THE DRAWINGS

For a better understanding of the present invention and to show how the same may be carried into effect, embodiments of the present invention will now be described with reference to the following drawings:

FIG. 11 shows a page displayed by the client user interface in accordance with an embodiment of the present invention;

FIG. 12 shows a document displayed on the user interface in accordance with an embodiment of the present invention;

FIG. 15 is a schematic representation of a communication system in accordance with an embodiment of the present invention.

DETAILED DESCRIPTION

Figure 1:
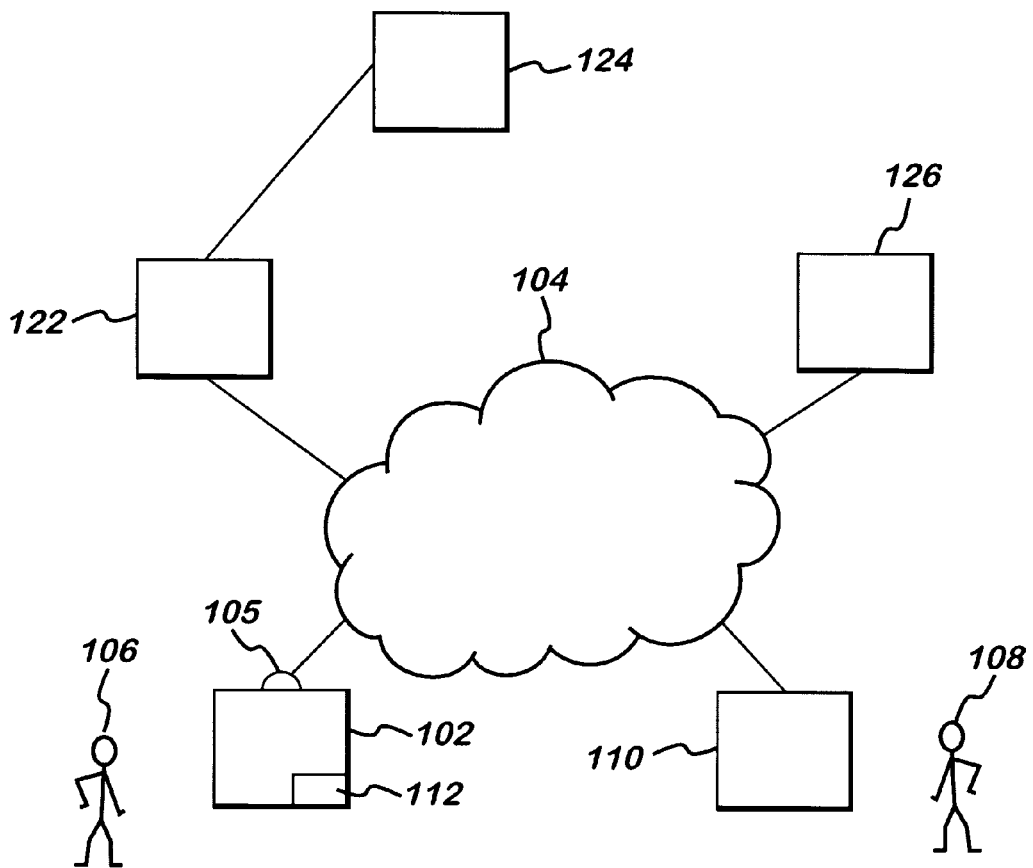
FIG. 1 is a schematic representation of a communication system in accordance with an embodiment of the present invention.

Reference will first be made to FIG. 1, in which is shown a communication system 100. The communication system includes a packet switched network such as a peer to peer network 104 which is provided by the internet. The communication system may also include a circuit switched networks such as a PSTN (Public Switched Telephone Network) (not shown). It should be appreciated that even though the exemplifying communications system shown and described in more detail uses peer to peer and PSTN networks, embodiments of the present invention can be used in any other suitable form of network.

First and second user devices 102 and 110 are shown to be connected to the peer to peer network 104. In practice there are many user devices connected to the network 104, however only two user devices are shown for clarity.

A user device may be, for example, a personal computer, a gaming device, a personal digital assistant, a suitably enabled mobile phone or other device able to connect to the network 104. The user device 102 has a user interface means to receive information from and output information to a user of the device. In a preferred embodiment of the invention the interface means of the user device comprises a display means such as a screen and a keyboard or mouse. The user device 102 is connected to the network 104 via a network port 105, and may be via a cable (wired) connection or a wireless connection. The network 104 may be a network such as the Internet.

In accordance with an embodiment of the invention the network communication system 100 includes a data store 126 that stores data relating to a party that may be called via the network 104. In accordance with an embodiment of the invention a data entry exists for each party. The data entry may include the contact details and location information for the party, keywords that assist searching the directory for the party and rating information as explained hereinafter. In one embodiment of the invention the data store 126 may be provided on at least one server.

If the user device is connected to the network 104, then it may be running a client program 112. The client 112 is a software program executed on a local processor in the user device 102. The client 112 has a number of different components or layers for implementing various functions, including a protocol layer 402 (FIG. 2) for managing the network interface.

Also connected to the peer to peer network 104 is a backend server 128. The backend server 128 may be located within a private network of the peer to peer network. The backend server 128 is responsible for storing user profile information for users of the peer to peer network that are running a client program 122.

The user profile information includes a list of contacts associated with the user. The list of contacts comprises a list of contact information for users of the communication system that the user of the user device 102 has previously stored as contacts. The contact information may define a telephone number, a VoIP client, an IM (Instant Messaging) client or any other destination address capable of receiving a communication event across the communication system. In one embodiment of the invention the contact information for the list of contacts may comprise a list of destination addresses within the internet 104.

The profile information for the user of the user device 102 stored on the backend server 128 also includes login details for the user of the user device. The login details may include a login name and password. The login details allow the user of the user device 102 to log in to the peer to peer network and allow the user of the user device 102 to be uniquely identified within the peer to peer network.

Figure 2:
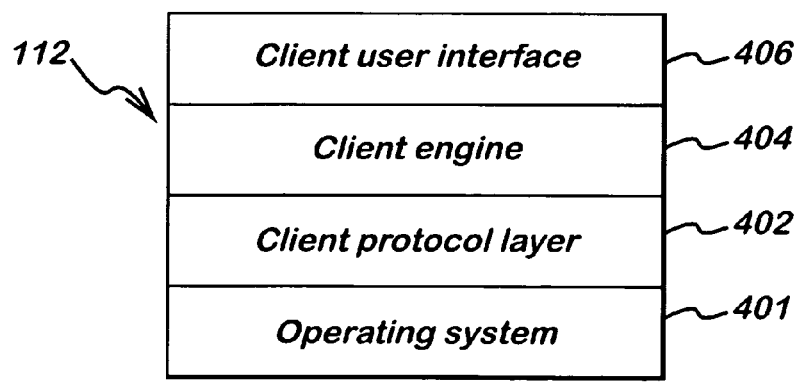
FIG. 2 shows a client stack.

FIG. 2 shows a protocol stack for the client 112 according to an embodiment of the present invention. The protocol stack shows an operating system layer 401, a protocol layer 402, a client engine layer 404 and a client user interface layer 406. Each layer is responsible for specific functions. Because each layer usually communicates with two other layers, they are regarded as being arranged in a stack as shown in FIG. 2. The operating system layer 401 manages the computer hardware and handles data being transmitted to and from the network. The client protocol layer 402 of the client software communicates with the operating system 401. Processes requiring higher level processing are passed to the client engine layer 404. The client engine 404 also communicates with the user client user interface layer 406. The client engine may be arranged to control the client user interface layer 406 to present information to the user via the user interface means and to receive information from the user via the user interface means. The control of the client user interface 406 will be explained in more detail hereinafter.

FIG. 1 shows the user device 110 connected directly to the peer to peer network 104. In an alternative embodiment the user device 110 may be connected to a different network such as the public switched telephone network ("PSTN") or a mobile network (not shown in FIG. 1). If connected to the PSTN, the user device 110 may be a fixed line telephone, and if connected to a mobile network, the user device 110 may be a mobile telephone.

A user 106 of the first user device 102 can initiate a call with a user 108 of the second user device 110. In one embodiment of the invention the client interface is arranged to display a page, on a display provided by the user interface means of the first user device 102, to enable the user to initiate the communication. The page may list pre stored call data for a plurality of users, otherwise referred to as a list of contacts that correspond to the contact list stored on the backend server 122. To initiate the communication, the calling user 106 can click on the contact listed for the user 108 of the second user device 110.

Alternatively a telephone number for the second user device 110 may be displayed on a web page displayed in a browser running on the user device 102. As disclosed in our U.S. application Ser. No. 11/416,378, the client software may be arranged to recognise a telephone number displayed on a web page and to display the telephone number as a link that can be selected to initiate contact with the user 108 via the network 104. A number sequence displayed on a webpage may be recognised as a telephone number if the number sequence conforms to a predetermined set of rules that are applied by the client 112.

The calling user 106 can otherwise input an identity for the called user 108, such as a telephone number for the user device 110, or a username for the user 108 into the user device 102, using either a keyboard or a mouse to select alphanumeric buttons displayed on the screen. The client then sets up the call to the called user 108. The call may be made using VoIP, in accordance with methods known in the art, such as disclosed in WO 2005/009019. The communication may comprise voice, video, instant messaging ("IM"), short message service (SMS) or a combination thereof.

In an embodiment of the invention, the client 112 running on the first user device 102 may be arranged to allow the user 106 to store details the user 108 on the data store 126.

In accordance with an embodiment of the present invention the details of the user 108 of the second user device 110 to be saved on the data store 126 will include the information necessary to establish a connection via the communication system 100 with the second user device 110. The details may also include the postal address of user 108. The information that may be used to contact the user 108 will hereinafter be referred to as the contact details of the user.

When the client 112 running on the user device 102 detects that the user is initiating a via the communication network 104, the client user interface may allow the user 106 to store details of the called party, in this case the user 108, to the data store 126.

Figure 3:
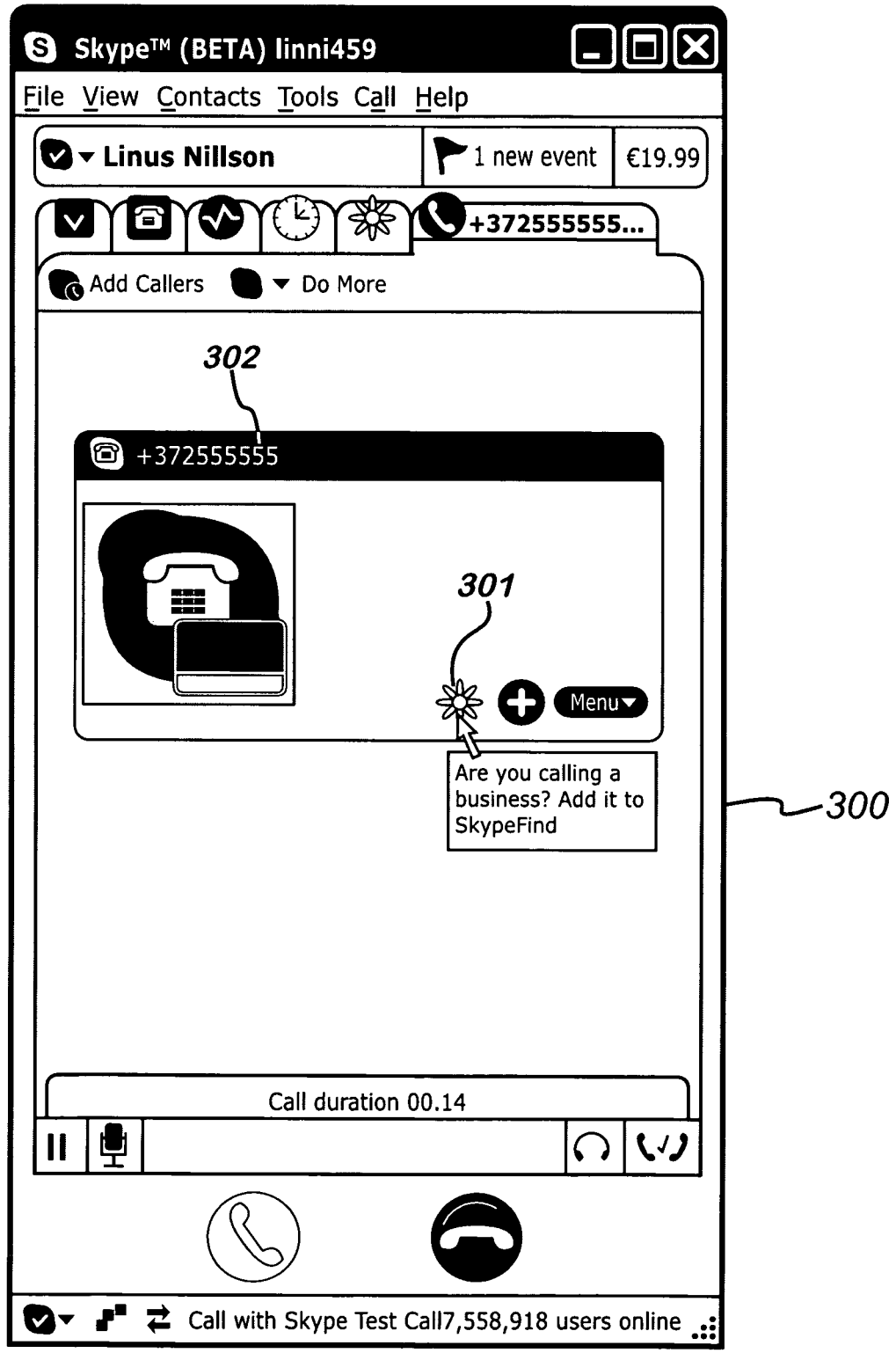
FIG. 3 shows a page displayed by the client user interface in accordance with an embodiment of the present invention.

The page 300 as shown in FIG. 3, is one example of how the client user interface may display a selectable option that allows the user 106 to save the details of the called user 108.

FIG. 3 shows a page 300 that may be displayed on a display screen of the user device 102 by the client user interface, in response to the user establishing a communication event with the user 108.

Pages displayed on the display screen may be implemented, for example, using HTML (Hyper Text Markup Language) or code that is specific to the client software 112.

The page 300 displays the identity of the called user 108, such as the telephone number of the called user device 110 in section 32. Page 300 also displays a selectable link 301 that the user may select to indicate to the client software that the called user information should be stored to the data store 126.

Figure 4:
FIG. 4 shows a page displayed by the client user interface in accordance with an embodiment of the present invention.

According to a further embodiment of the invention, if the client user interface detects a telephone phone number displayed on a webpage as described in our application U.S. application Ser. No. 11/416,378 the client user interface may be arranged to allow the user to enter the detected telephone number in the data store 126. As described in our above identified U.S. application Ser. No. 11/416,378, the client 112 may recognise a sequence on a webpage as a telephone number if the sequence satisfies a predetermined set of rules. FIG. 12 shows a section of a web page 10 displayed in a browser 12 as shown on the display of the user device 102. In accordance with an embodiment of the invention, when the client 112 recognises a telephone number 14 on the web page 10 the client is arranged allow the user to store the number on the data store by, for example, displaying a link 16 that allows the user to store the telephone number on the data store 16. If the user selects this link an entry page 500 as shown in FIG. 4 is displayed to the user to allow the user to input the details to be stored on the data store 126. The entry page 500 is described hereinafter.

In an embodiment of the invention the client 112 is arranged to search the data store 126 with the details of the user 108 to determine if an entry already exists for the user 108. This may be in response to the client 112 detecting that the user 106 has established a call or in response to detecting a phone number on a webpage.

The client engine generates a search data store message containing the contact information used to establish a call or displayed on the webpage. The client protocol layer is then arranged to transmit the search data store message to the data store 126 via the network 104.

The data store 126 is searched using the contact information included in the search data store message sent from the user device 102.

If the contact details provided in the search data store message do not match any entries stored on the data store 126 the client may be arranged allow the user to store the details of the party. If the data store was searched in response to the user initiating a call, the client user interface is arranged to display the page 300 as shown in FIG. 3 and as described above. As previously described the user may then store the called party details by selecting the link 301. Alternatively, if the data store was searched in response to a number being detected on a webpage, the client user interface is arranged to display the link 16 that allows the user to store the number on the data store 126 as previously described in relation to FIG. 12.

In one embodiment of the invention, if an entry is found on the data store 126 for contact information detected during a call or detected on a web page, the client interface is arranged not to display the link 301 as shown in FIG. 3, or the link 16 as shown in FIG. 12 that allows the user to add the contact information to the data store 126.

If an entry is stored on the data store 126 having contact information matching the contact information provided in the search data store message, the details for the entry are retrieved from the data store 126 and sent via the network 104 to the user device 102.

If an entry is found on the data store 126 having contact information matching the contact information detected during a call, the client user interface is arranged to display the called user party details during the call.

Figure 13:
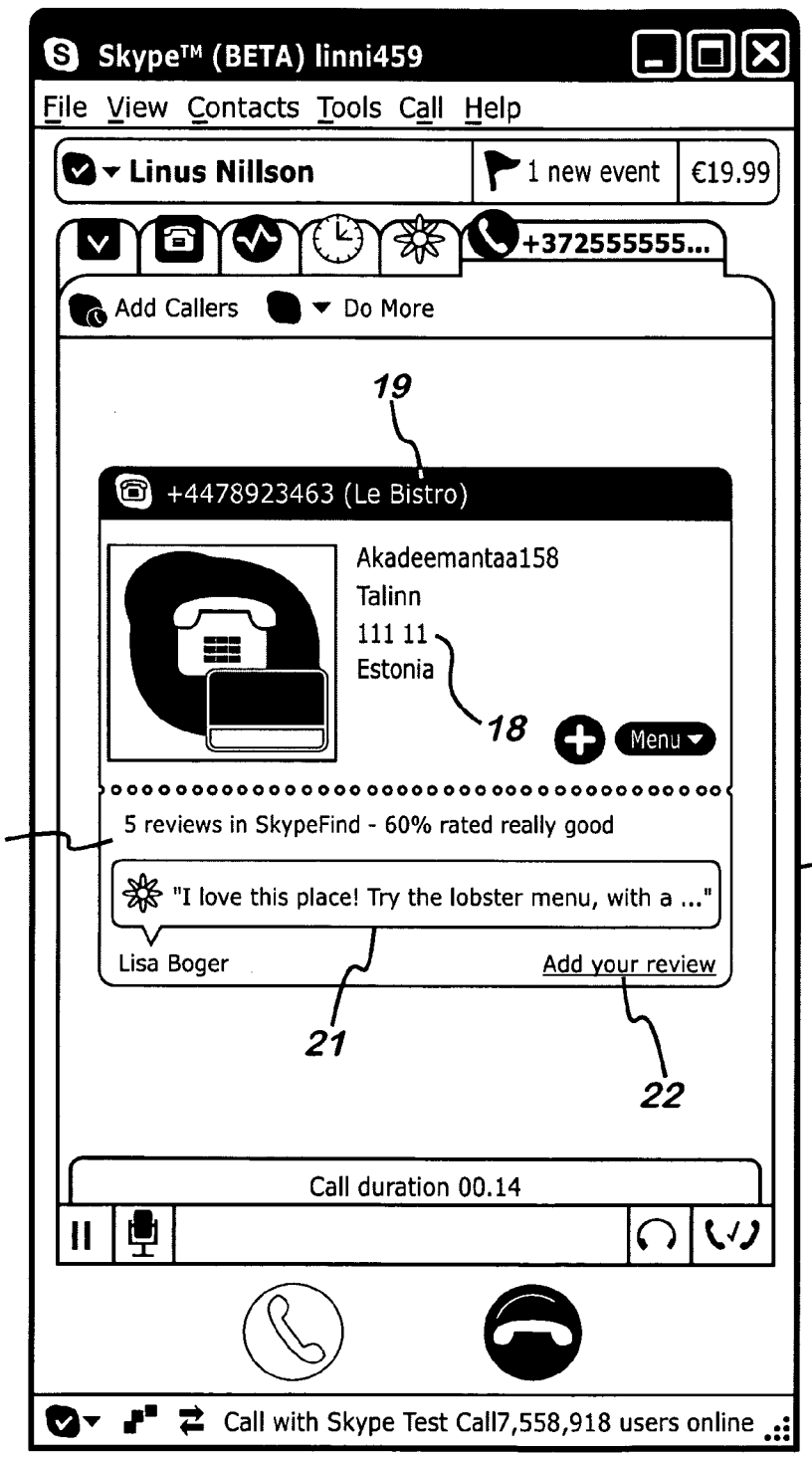
FIG. 13 shows a page displayed by the client user interface in accordance with an embodiment of the present invention.

FIG. 13 shows a page 17 displayed during a call when the contact information entered to initiate the call is found to match the contact details for an entry stored on the data base. The page 17 displayed during the call shows at least some of the details for the called user that are stored on the data store 126. This may include the postal address 18 of the called user and the name 19 of the user 108. Page 17 may also include information relating to any ratings that are stored in for the called user 108 on the data store 126.

Figure 8:
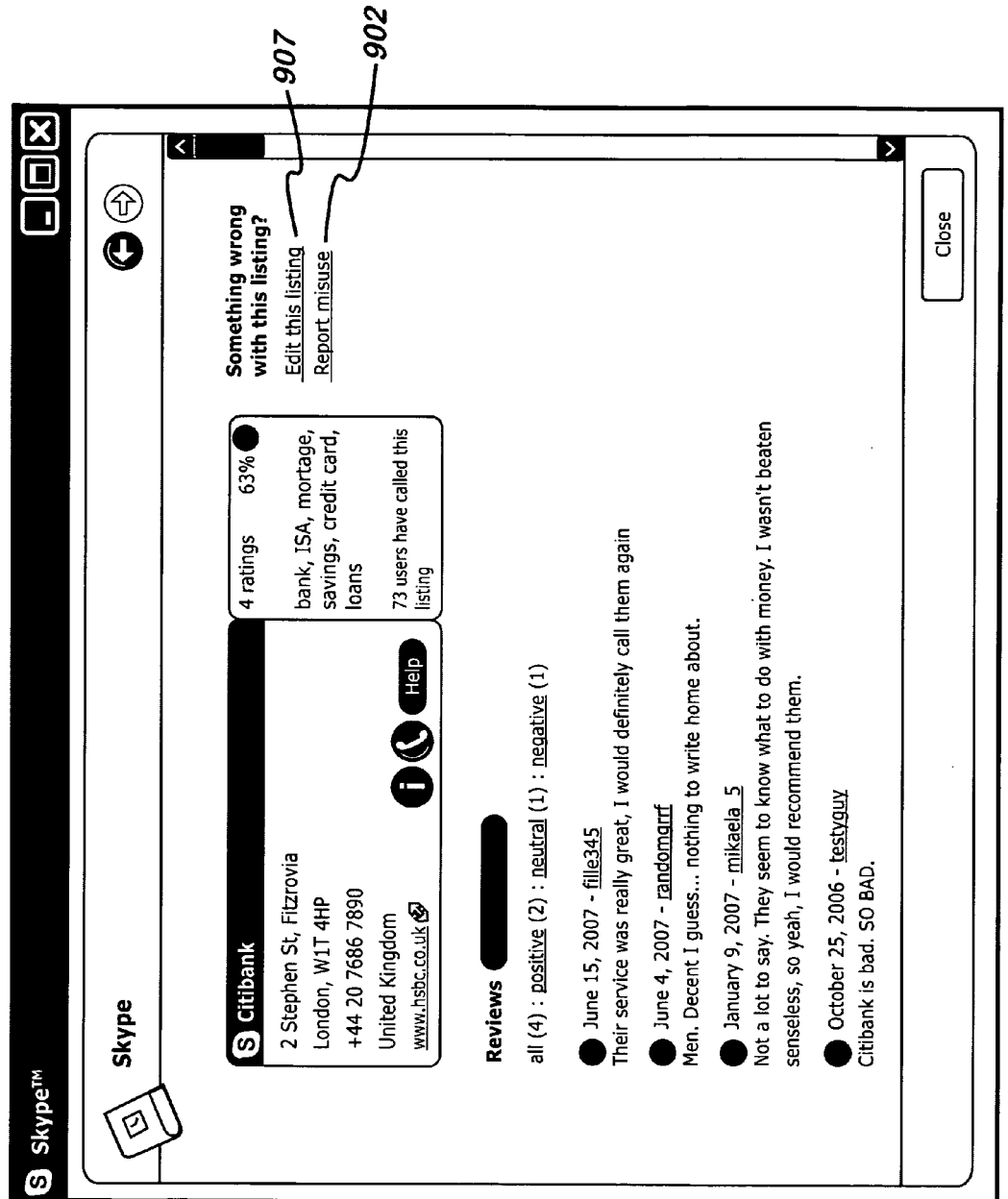
FIG. 8 shows a page displayed by the client user interface in accordance with an embodiment of the present invention.

Page 17 may also display a least one comment 21 that is stored for the entry. If a comment is displayed, as shown in FIG. 13, the review may be a link which when selected causes the client to display the review page 901 as shown in FIG. 8.

If an entry is found on the data store 126 having contact information matching the contact information detected on a webpage, the client user interface is arranged to display details relating to contact information on the webpage. According to an embodiment of the invention a related address may be displayed. In a preferred embodiment of the invention, information relating to any ratings that are stored in relation to the entry may be displayed on the webpage. For example, the most recent rating added to the entry may be displayed. Alternatively the client user interface layer may be arranged to display an average rating.

The above describes examples of the way in which information retrieved from the data store 126 may be displayed either during a call or in relation to a telephone number displayed on a webpage. These examples are not exhaustive and it should be appreciated that any information stored for a party called, or displayed on the webpage may be retrieved from the data store and used by the client 112.

Figure 10:
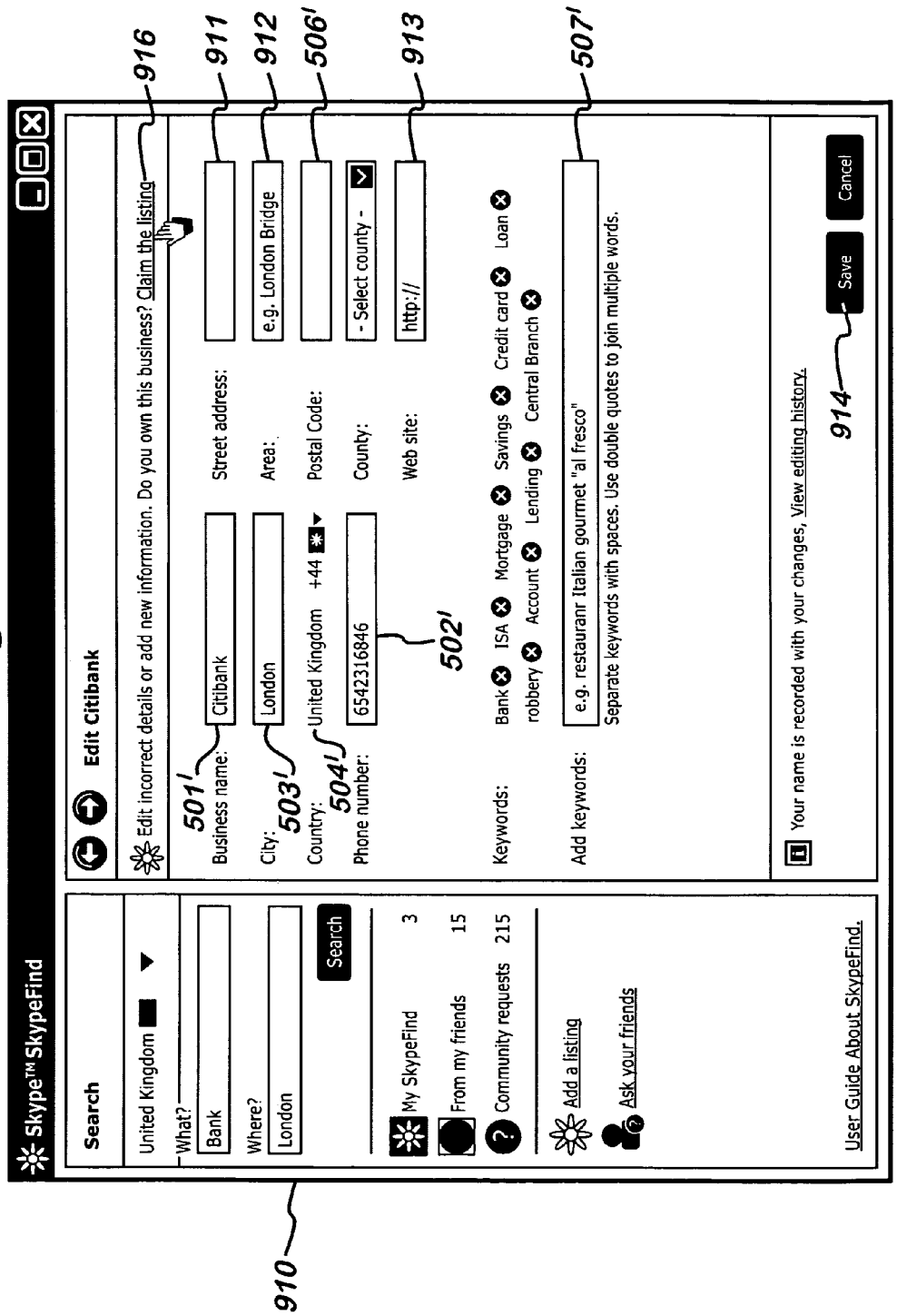
FIG. 10 shows a page displayed by the client user interface in accordance with an embodiment of the present invention.

If an entry is found on the data store 126 the client may be arranged to display a link that allows the user to edit the entry on the data store 126. The user may edit the entry on the data store by adding a comment or a rating, or by amending the contact information. As shown in FIG. 13, the client may display a link 22 on page 17 that allows the user 106 to add a review for the called user 108 on the data store 126. Selecting the link 22 will cause the client interface layer to display the edit page 910 as shown in FIG. 10.

In an alternative embodiment of the invention, if an entry is stored on the data store 126 having contact information matching the contact information provided in the search data store message, the keywords of that entry are used as the searching criteria for a secondary search. The secondary search may provide the user 106 with information of other entries that contain the same keywords as the entry identified by the search data store message.

The secondary search may also use location information of the entry identified by the search data store message as additional searching criteria. According to this embodiment of the invention the secondary search will provide the user 106 with information of entries for parties that are located in the same area as the party identified by the entry being called or detected on the web page.

A secondary search message is generated containing the keywords of the entry identified by the initial search data store message. The secondary search message may also contain location information associated with the entry identified by the initial search data store message. In one embodiment of the invention the secondary search massage is generated at the data store 126 in response to finding an entry that matches the contact details contained in the initial search data store message. In an alternative embodiment of the invention the secondary search message may be generated by the client 112 in response to receiving the details for the entry retrieved from the data store 126 by the initial search data store message.

The secondary search message may be used to search the data store 126. The secondary search message may also be used to search to search an alternative data store. The alternative data store may belong to a third party. In an alternative embodiment the secondary search message may only be used to search the alternative data store.

Figure 16:
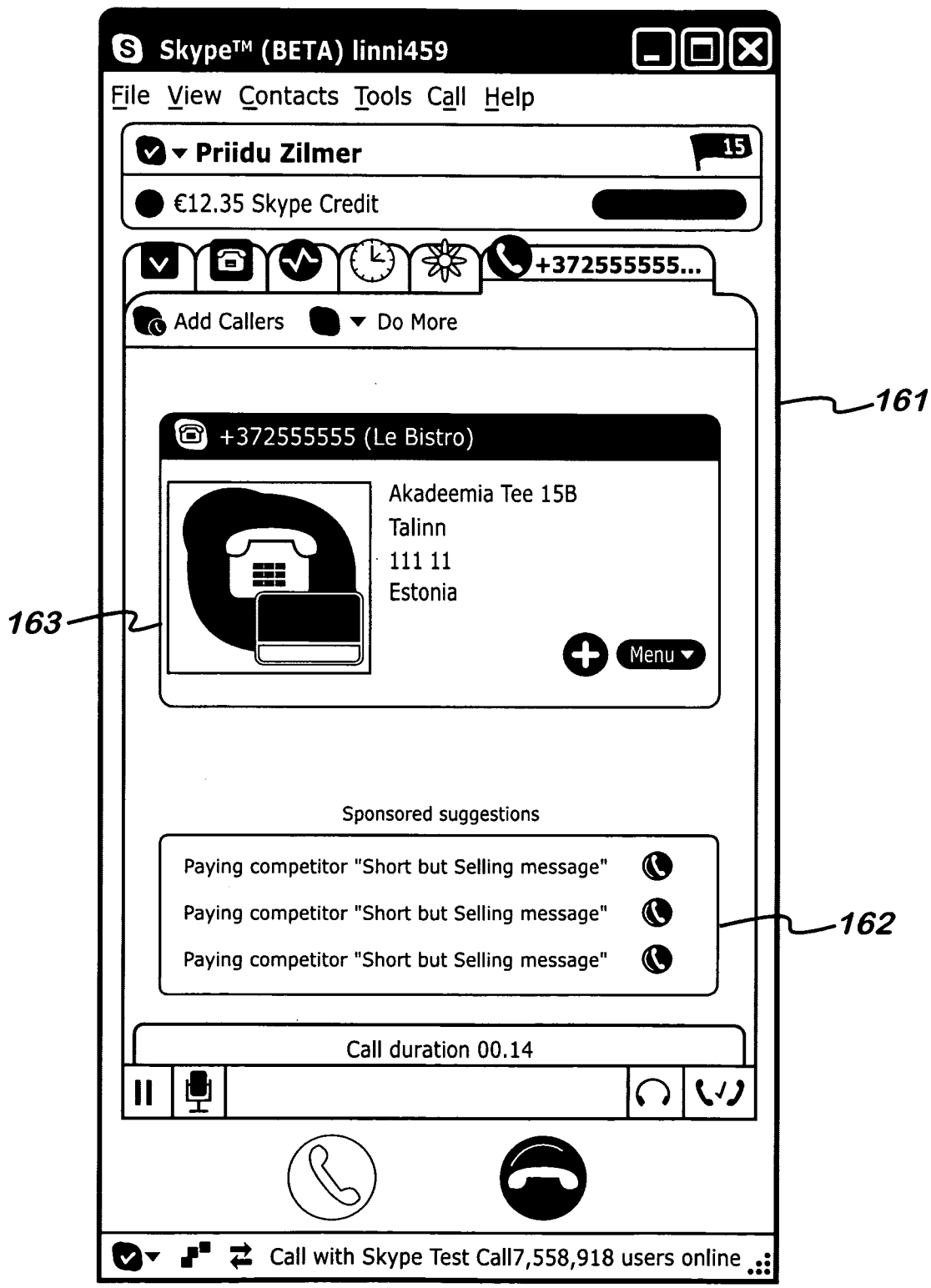
FIG. 16 shows a page displayed by the client user interface in accordance with an embodiment of the present invention.

Details of any entries matching the keywords and location specified in the secondary search message are sent to the user device 102 via the network 104. FIG. 16 shows a page 161 displayed during a call that contains the details of entries identified by the secondary search message. The details of the entries matching the secondary search are displayed in data field 162. As previously explained in relation to FIG. 13, details for the called user that were retrieved by the initial search data store message are also displayed during the call in data field 163.

When a call is initiated to a telephone number detected on a web page, in a further alternative embodiment of the invention information provided on the webpage may be used as searching criteria to search for other contacts that are associated with the number being called. Information on the webpage may be used to search entries on either the data store 126 or an alternative data store.

According to this embodiment of the invention the client 112 is arranged to search the webpage for searching criteria in response to the user 106 initiating a call with a number detected on the web page. For example the client may search the content of the webpage and the URI (Uniform Resource Identifier) of the webpage for a character sting that matches keywords in a predetermined list. Alternatively the client may select portions of the URI according to a set of predetermined rules. For example, character stings located between two symbols such as '/', or '&' may be selected by the client 112 to be used as a searching criteria. Accordingly when a call is initiated from a number contained on a webpage with the following URI:

'http://www.directory.com/london/restaurants/search=chinese&submit' the client may identify the character strings 'london', 'restaurants' and 'chinese' as search terms.

When the client has identified character strings that may be used as search terms the client 112 will generate a search directory message containing the search terms identified from the webpage. The search directory message may be used to search the data store 126 or an alternative data store.

Any entries on the data store matching the search terms identified from the webpage will be transmitted to the user 106. In a preferred embodiment the client 112 is arranged to display the entries retrieved by the search directory message during the call as shown in FIG. 16.

In one embodiment of the invention, searching the data store with information from the webpage may be performed as a secondary search in addition to searching the data store with the contact information used for establishing the call or detected on the webpage.

The following now describes how the client 112 is arranged to allow the user to store information on the data store when no entries have been found that match the contact details contained in the search directory message.

Contact information used to establish the call between user device 102 and user device 110, or provided on the webpage may be stored in a local memory of the user device 102. When the user selects the link 301 to indicate that the called user details are to be saved, the client 112 is arranged to retrieve the contact information from the memory so that the user is not required to manually enter the information again.

FIG. 4 shows an entry page 500 that may be displayed by the client user interface 406 in order to enter information relating to the user 108. The entry page may be displayed when the user 106 selects a link indicating that he wishes to store the information relating to the user 108 on the data store 126 as described above. As shown in FIG. 4, the screen includes data fields 501-506 for entering information relating to the user 108.

The client user interface 406 is controlled by the client 404 engine to populate some of the data fields with the contact information stored in the local memory of the user device 102. For example the phone number data field 502 may be populated by the client 112 from the contact details stored in the local memory of the user device. The country data field 504 may also be populated by the client 112 using information which may be determined from the contact information stored in the local memory of the device 102. The client 112 may be arranged to recognise the country code prefix of the telephone number. Such an arrangement is disclosed in our U.S. application Ser. No. 11/416,378.

The user 106 may add further information to the information already added to the data fields by the client 112. For example, the user may add a business name to the business name data field 501. The user may also delete information or edit information in a data field already populated by the client.

The user 106 may also add other information to be stored on the data store 126 in addition to contact information. For example the user may add keywords in a keyword data field. The stored keywords may indicate the contact type, e.g. hairdressers, and can be used as searching criteria when searching information stored in the data store 126.

The user 106 may input a rating to be stored in the data store 126. For example, if the contact information relates to a business the user may rate the quality of the service offered by the business. In one embodiment the rating may be given in the form of a percentage, 100% being a very good rating and 0% being a very poor rating. In an alternative embodiment of the invention the user may select a rating from rating options, for example the user may select one of excellent, very good, fair or poor. The rating information is then be stored with the contact details of the business in an entry in the data store 126.

In a further embodiment of the invention the user 106 may also include a comment to be displayed with the contact information when the contact information is retrieved from the data store 126. The user may type a comment in the comment data field 508.

The following now describes how the client 112 is arranged to allow the user to edit information on the data store when an entry is found that matches the contact details contained in the search directory message.

If the details of the user 108 are already present on the data store, the client may be arranged to display an edit page 910 as shown in FIG. 10 in response to a user selecting a link, such as link 22 shown in FIG. 13 to indicate that he wishes to edit the entry.

The editing page 910 includes data fields for updating the contact information for the selected entry stored on the data store 126. The data fields may include a business name data field 501', a telephone number data field 502' and location data fields 503', 504', 911, 912, 506'. The editing page 910 may also be provided with a keyword data field 507' for entering additional keywords.

When the user accesses the edit page 910 the data fields are populated with the data currently stored on the data store. The user may then edit the information in the data field.

Once the user has edited the information in the data fields the data may be sent to the data store to update the entry for that contact by selecting a submit button 914 provided on the editing page 910.

According to one embodiment of the invention a user of the communication network 104 may prevent other users of the communication network 104 from changing at least some of the information stored for a particular entry in the data store 126. Accordingly a user who is the owner of a business whose details are stored on the data store 126 can prevent other users of the communication network 104 from editing the contact details of the business. Preventing other users from changing at least part of the details stored on the data store 126 will hereinafter be referred to as claiming an entry on the data store.

In a preferred embodiment of the invention, claiming an entry in the data store allows the user who has claimed the entry to edit contact details and keywords associated with the entry. Other users of the communication network are prevented from editing the contact details and keywords. Other users are permitted to edit the rating and comments associated with a claimed entry.

As mentioned previously, in a preferred embodiment of the invention a user that communicates via the communication network by using client software installed on their user device is uniquely identifiable within the network 104 by the user's login details. According to an embodiment of the invention, if a user wishes to claim a listing on the data store 126 the login details, or any other identifier that is unique to the user who is claiming the listing, are stored together with the entry on the data store. When an entry has been claimed, only a user having the login details that match the login details saved with the claim entry is able to change certain details in the entry.

Figure 6:
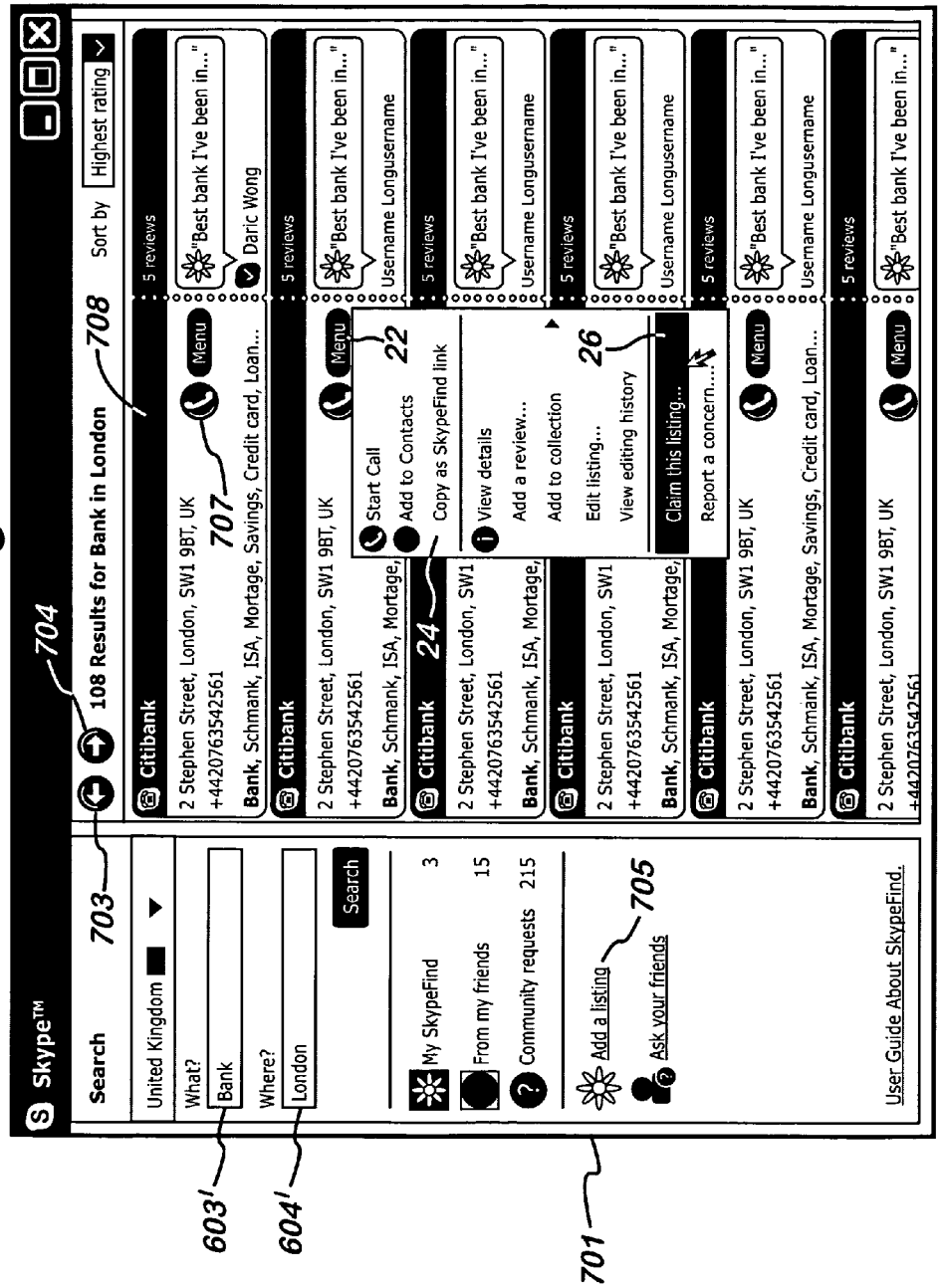
FIG. 6 shows a page displayed by the client user interface in accordance with an embodiment of the present invention.

FIG. 6 shows an example of a page 701 displayed by the client user interface that allows a user to claim a listing. The page 701 displayed in FIG. 6 is a results page that is displayed to a user that has input a request to the client 112 to search the data store 126, as will be explained in detail hereinafter. As shown in FIG. 6, the option to claim an entry may be provided as an item 26 in a drop down menu 24 that is displayed when the user selects the menu button 22 corresponding to a entry 708 shown on the results page 701. Alternatively the option to claim an entry may be presented on the editing page 910 (FIG. 10) as a selectable link 916.

In an embodiment of the invention the client interface is arranged to display the option of claiming an entry to the user only if it is determined from the data store 126 that the entry has not already been claimed.

When the user indicates that he wishes to claim an entry by, for example, selecting a link 916 (FIG. 10) or item 26 in a menu 24 (FIG. 6) as described above, the client engine is arranged to generate a 'claim entry' message that identifies both the entry on the data store 126 and the user 106 of the user device 102. The user may be identified with the user's login details or with any other identifier that is unique to the user. The client protocol layer then transmits the claim entry message to the data store 126.

On receipt of the claim entry message the data store is arranged to store the identifier of the user 106 together with the entry that is claimed. When an entry has been claimed the data store is arranged to restrict at least part of the information in the entry that may be edited by other users. In one embodiment of the invention, only a user having an identifier that matches the identifier stored in association with the claimed entry may edit the restricted information.

In one embodiment of the invention the user 106 is required to pay a fee to claim an entry. The user may pay a fee electronically to a server associated with the data store 126 via the network. The data store is arranged to receive payment confirmation from the server before storing the user identifier together with the claimed entry.

When a user 108 attempts to edit an entry that has been claimed by a user 106, the data store 126 is arranged to compare the identifier of the user 108 with the identifier of the user 106 that is stored with the claimed entry. If it is determined that the identifier for the user 108 does not correspond to the user identifier that is stored with the claimed entry, the data store is arranged to transmit a message to the device 110 used by the user 108 indicating that at least part of the details for the entry cannot be edited. In a preferred embodiment of the invention the contact details for a claimed entry cannot be edited by another user 108.

In response to receiving a message from the data store 126 indicating that an entry is claimed by another user, the client engine may control the client user interface to display a message indicating that the entry is claimed. In one embodiment of the invention the comment may be added to a claimed entry by any user. In this embodiment the client user interface may also display an option for allowing the user 108 to add a comment together with the message indicating that the entry is claimed.

FIG. 11 shows a page 34 that may be displayed by the client user interface when the entry that the user has attempted to edit has been claimed by another user. As shown in FIG. 11 the user 108 is able to add a rating in one of the rating options 30, 31 and 32 displayed on the page 34. Additionally the user may enter a comment in the comments field 36. The user may then select the 'add' button 35 displayed on page 34 to add the rating information and add the comment to the entry in the data store.

In response to selecting the add button the client engine generates a message containing the rating information and the comment. The message is then transmitted to the data store 126 via the network 104. On receipt of the message the data store is arranged to store the rating information and comment information in the entry.

In accordance with a further embodiment of the invention the client user interface may also be controlled to allow a user to search for an entry in the data store 126.

Figure 5:
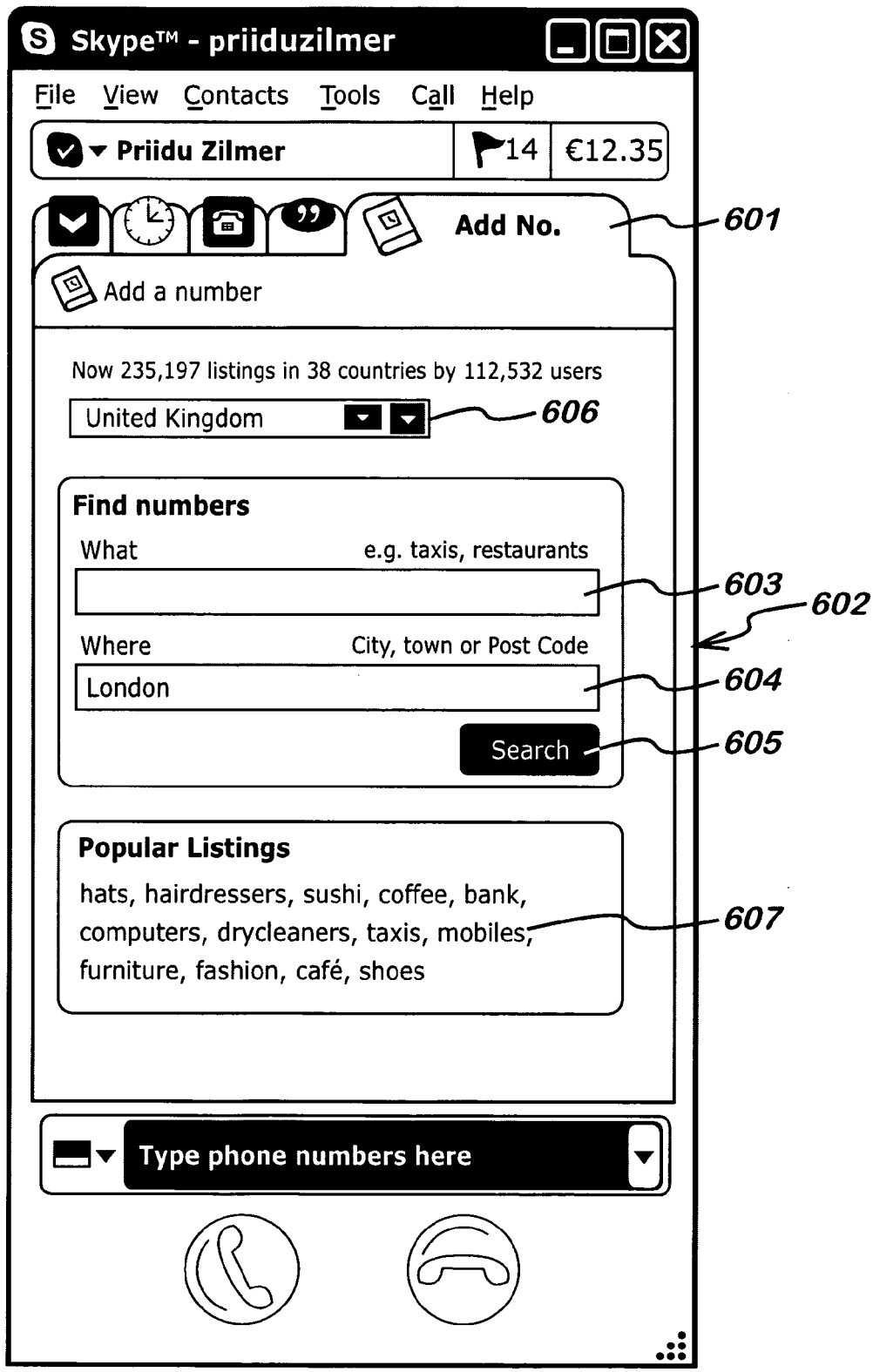
FIG. 5 shows a page displayed by the client user interface in accordance with an embodiment of the present invention.

A user may access a search entry page by selecting a search tab 601 (FIG. 5), selectable link or button provided by the client user interface. In response to the user selecting the search tab 601, the client engine 404 is arranged to control the client user interface to display a search entry page 602 as shown in FIG. 5.

A user may search the data store by searching for a type of contact in a particular location. The user may input the type of contact information required, for example 'hairdressers' into a contact type data field 603 in the search entry page 602. The contact type information entered in field 603 may be used to search the keywords stored on the database. The user may also input the required location, for example 'London' into the location data entry field 604. The user may then select a search button 605 to submit the information input in fields 603 and 604 to search the data store 126.

The search entry page may also be provided with a country data field 606. A default country may appear in the country data field 606 when the search entry page is displayed. The default country may be set as the country in which the user is located. This information may be preset by the user as part of the user profile information. The user may enter a different country in the country data field either manually or by selecting a country from a drop down menu.

The search entry page may also include a list of popular keywords that are stored on the data store 126. The popular keywords may be displayed as selectable links in field 607. In one embodiment of the invention the popular keywords displayed are popular keywords that are stored on the data store 126 for the country identified in the country data field 606.

In one embodiment of the invention the client application is arranged to search the data store 126 for a list of the keywords that are associated with the greatest number of entries for the identified country and to display the results to the search in the field 607 as selectable links.

In an alternative embodiment of the invention the client may be arranged to search the data store for a list of keywords that are associated with the most called entries for the identified countries and to display the results to the search in the field 607.

The user may search the data store by either selecting a keyword in the field 607 or by selecting the search button 605 to search the data store using the information input into data fields 603 and 604. When the user searches the data store by selecting a keyword displayed as a link, any information entered in data fields 603 and 604 may be ignored.

When the user submits information to search the data store 126 by for example selecting the search button 605 as described above, the client engine may be arranged to generate a search data store message in response to the users request to search the data store. The search data store message includes the contact information entered by the user in contact fields 603 and 604. The client protocol layer is then arranged to transmit the search data store message to the data store 126 via the network 104.

According to one embodiment of the invention, before the contact information is sent in the search data store message, the text of the content information input by the user in data fields 603 and 604 may be spell checked to ensure that the data store is searched using information that is spelt correctly. The spell checker may be implemented as an application running on the user device. The spell checker application may be arranged to detect the language setting of the client software installed on the computer in order to search for the correct spelling in the language setting of the client software.

The data store 126 is searched using the content information included in the search data store message sent from the user device. The search data store message also includes details of the user that transmitted the message. In one embodiment of the invention the user details transmitted in the search data store message are limited to details that facilitate the search results to be returned to the user that sent the search data store message. These details may include a telephone number of the user device or the user ID of the user. In an alternative embodiment of the invention the message may include user profile information such as the age or gender of the user. This information may be used to enhance the searching criteria for searching the database. For example the results of the search may be limited to content uploaded by users in the same age group.

The entries searched on the data store 126 may be limited to entries matching the location input in the location data entry field. The entries stored on the data store 126 with content matching the content information provided in the search data store message are retrieved from the data store 126 and sent via the network 104 to the user device 102.

When the client engine receives the information from the data store 126, the client engine is arranged to control the client user interface to display the entries. The entries may be displayed on a results page.

FIG. 6 shows a results page 701 according to an embodiment of the present invention. In one embodiment of the invention only some of the entries received from the data store are displayed. The contact details for each entry displayed on the results page may be stored on a local memory of the user device 102. The user may select further entries by scrolling through the results pages using the left and right arrow buttons 703 and 704.

According to an embodiment of the invention the results page 701 may allow the user to search the data store again with a new criteria. Therefore the results page may also include a content type data field 603' and a location data field 604.

When the results of the search are displayed, the client interface is arranged to allow the user to establish a communication with one of the called users listed in the results page. In a preferred embodiment of the invention the communication is a voice call. In alternative embodiments of the invention the communication may be a text message, instant message or another type of communication. In one embodiment of the invention the user may establish a call by selecting a call button 707 provided in relation to an entry 708 as shown in FIG. 6. On the selection of a call button 707 the client is arranged to establish a call with the contact 708 associated with the call button 707 using the contact details retrieved from the data store 126.

If the data store 126 does not contain any entries that match the searching criteria entered by the user in the content type data field 603 or 603', and the location data field 604 or 604', the data store may send a response to the client engine indicating that the search criteria did not match any entries. On receipt of this notification the client engine may control the client user interface to display a notification to the user that no results were found.

Figure 7:
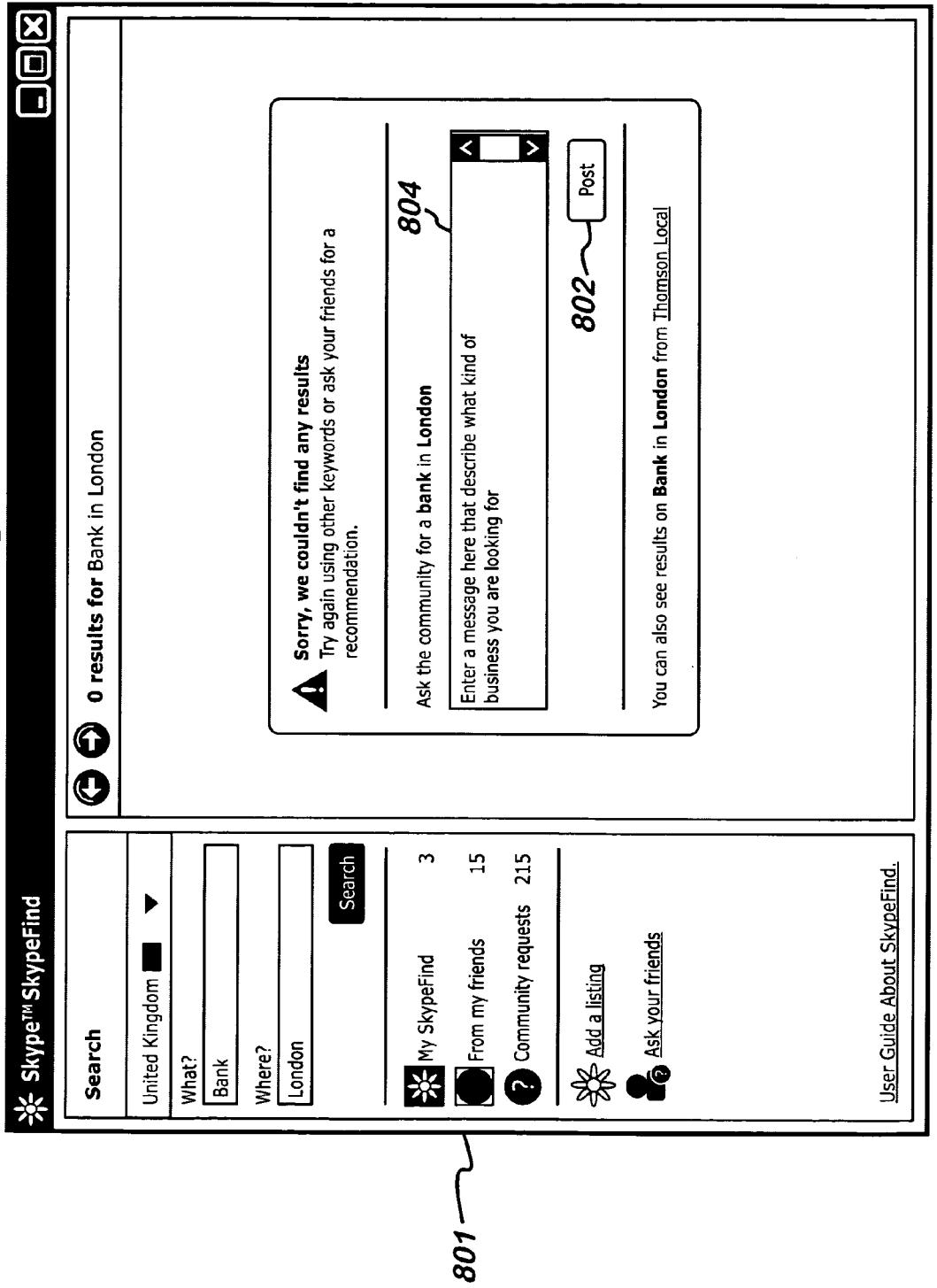
FIG. 7 shows a page displayed by the client user interface in accordance with an embodiment of the present invention.

FIG. 7 shows an example of a page 801 that is displayed by the client user interface 406 when no results are found.

According to an embodiment of the invention, in response to a message from the data store 126 indicating that the search criteria did not match any entries, the client engine controls the client interface to provide the user with means for posting the searching criteria on a request page that is accessible to other users of the network. This will be described with reference to FIG. 15 which shows the communication network 104, users 106 and 108', the data store 126 and a request server 128.

The searching criteria used to search the data store 126 may be stored in a local memory of the user device 102 when it is entered by the user to search the data store. The client engine is arranged to retrieve the search criteria from the memory and to control the client user interface layer to display searching criteria together with a link that causes the searching criteria to be posted on a request page stored on the request server 128. As shown in FIG. 7, page 801 the displays the link 802 that causes the searching criteria to be posted. The user may add further information in data field 804 to be posted with the searching criteria.

When the user 106 selects the link 802 to indicate that the searching criteria is to be posted on the request page, the client engine is arranged to generate a request message to be posted on the request page that includes the searching criteria retrieved from the local memory. The request message may also include an identifier of the user that has posted the request.

In a preferred embodiment of the invention the searching criteria retrieved from the local memory specifies a contact type and a location.

The request message is transmitted to the request server 128 that stores each request. In one embodiment of the invention the request is stored with an identifier that identifies the request and an identifier that separately identifies the user 106. The identifier that separately identifies the user 106 may be the login name of the user 106. In an alternative embodiment the request is stored with a request identifier from which the identity of the user 106 may be determined.

The request server may be co-located with the data store. Alternatively, as shown in FIG. 15, the server may be geographically separate from the data store 126.

Figure 9:
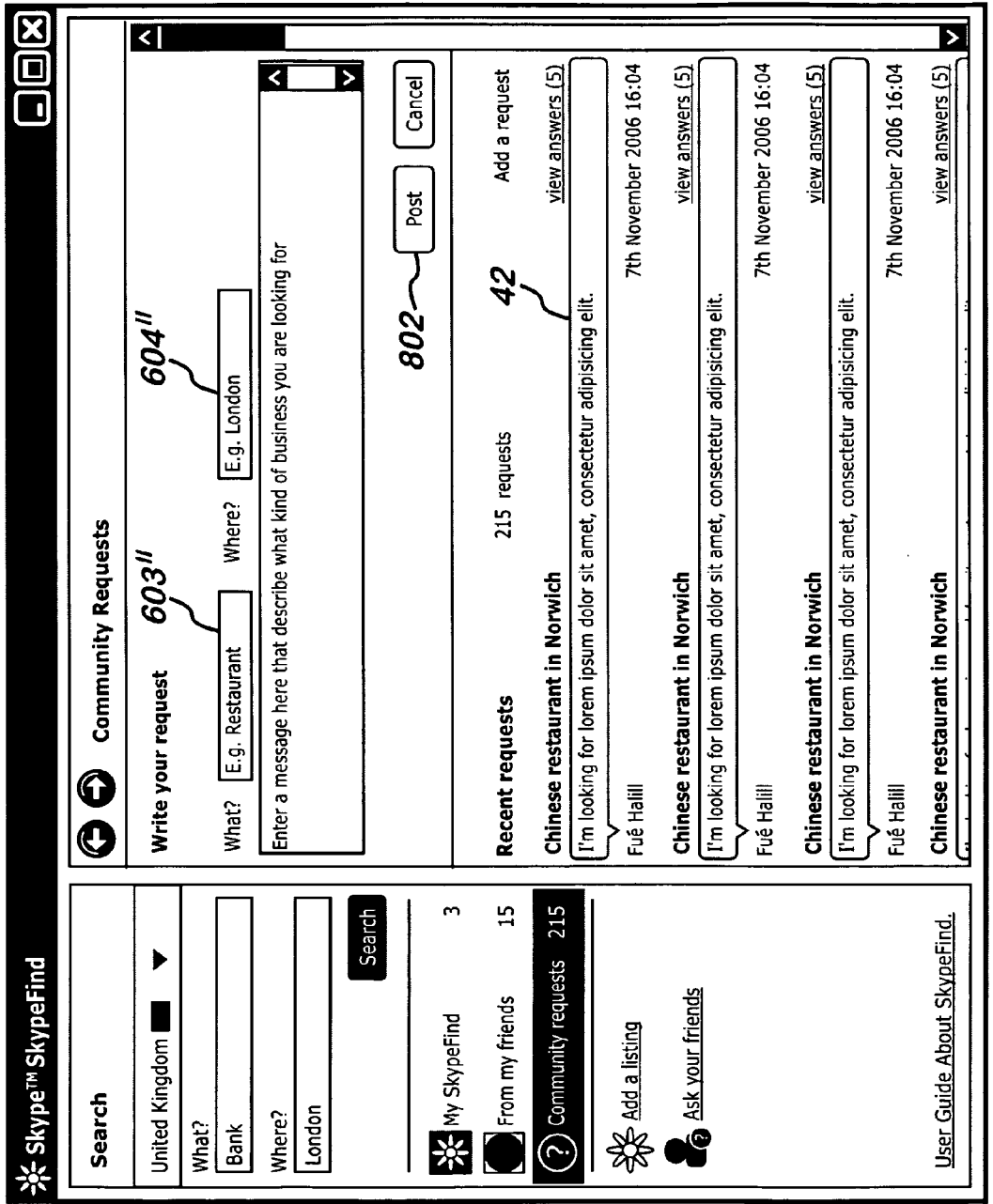
FIG. 9 shows a page displayed by the client user interface in accordance with an embodiment of the present invention.

When the user has posted the request by selecting the link 802 on page 801, the request page 41, as shown in FIG. 9, is displayed by the client interface. The information displayed on the request page 41 is retrieved by the client engine from the request server 128.

The request page 41 may also be accessed by a link provided in other pages displayed by the client interface.

In an alternative embodiment of the invention the user may enter the criteria for a request. The data fields for entering the request criteria may be provided on the request page 41 as shown in FIG. 7. Since the criteria for the request is not generated from the criteria of a search the user is required to manually input the data into the request criteria data fields 603" and 604". The user may then select the link 802" to post the request.

The method by which a user 108' may respond to a request will now be described. Each request 42 may be displayed on the request page 41 as a link. The user 108' of the network 104 may respond to the request by selecting the request. On selection of the request the client interface layer is arranged to display an answer entry page 51 as shown in FIG. 14.

In one embodiment of the invention, when the answering user 128 selects a request 42, the request criteria of the request 42 may be detected by the client 112 running on the user device 110' and be stored in the local memory of the user device 110'.

Figure 14:
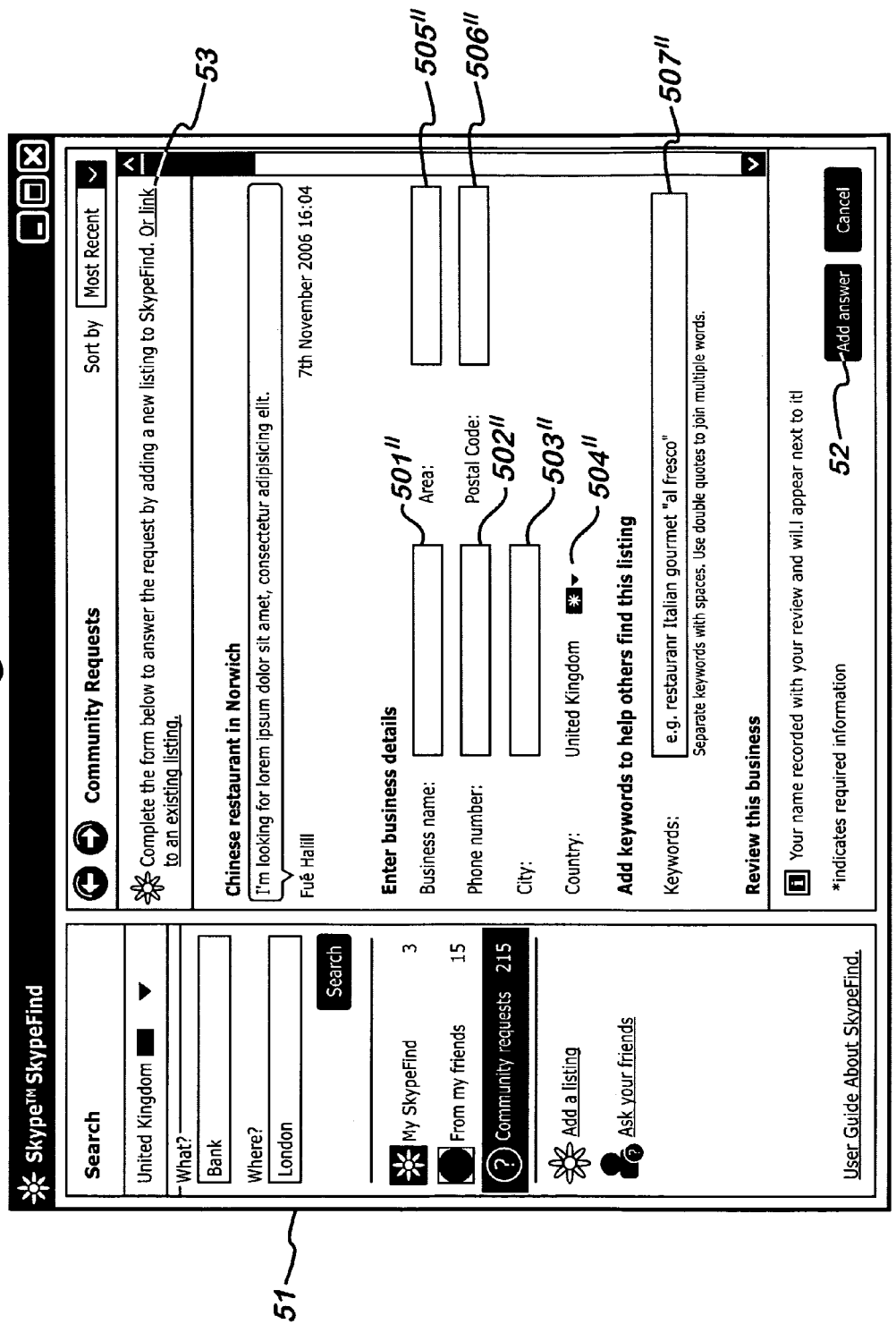
FIG. 14 shows a page displayed by the client user interface in accordance with an embodiment of the present invention.

FIG. 14 shows an answer entry page 51 that is displayed by the client user interface 406 for the user 108 to enter information relating to another user in the communication network that matches the requested criteria. As shown in FIG. 14, the page includes data fields 501"-506" for entering information relating to the user matching the request.

In accordance with an embodiment of the invention, the client user interface 406 is controlled by the client engine 404 to populate some of the data fields with the criteria included in the request. For example the area data field 505" may be populated with location information by the client 112 from the request criteria stored in the local memory of the user device. The keyword data field 507" may also be populated with contact type information by the client 112 using information which may be determined from the request criteria stored in the local memory of the device 102.

The user 108' answering the request adds specific contact information relating to the user that matches the request criteria. For example, the user may be required to add contact information and a business name to data fields 501"-503". The user 108' may also add additional keywords to data field 507" which specify the contact type.

In an alternative embodiment of the invention the data fields are not populated with information derived from the request criteria. In this embodiment the user 108' is required to enter the information manually.

When the user 108' has completed inputting information relating to another user in the communication network that matches the request, the user 108' may add this information to the data store 126 by selecting the add answer link 52 provided on page 51.

When the user selects the add answer link 52 the client engine layer is arranged to generate an add entry message containing the information inputted into data fields 501"-506". The add entry message also includes a specific identity for the request.

The add entry message is transmitted to the data store 126. Upon receipt of the add entry message the data store creates an entry for the business identified in the add entry message.

The add entry message is also transmitted to the request server 128. The add entry message may be transmitted to the request server directly from the user device 110', or via the data store 126. This is an implementation issue.

On receipt of the add entry message the server is arranged to notify the user 106 that posted the request, that the request has been answered. The request is identified by the request identity included in the add entry message. The identity of the user 106 who posted the request may be derived from the identity of the request included in the add entry message. Alternatively the identity of the user may be stored in association with the request.

In an alternative embodiment of the invention the user 108' may answer a request by linking the request to an existing entry on the data store 126. As shown in FIG. 14, on page 51 the client interface layer provides a link 53 that allows the user 108' to answer the request with an entry that exists on the data store 126. In response to the user 108' selecting link 53 the client interface is arranged to provide the user with the search entry page 602 as shown in FIG. 5. The user may then search for a listing and provide the listing as the answer to the request.

While this invention has been particularly shown and described with references to example embodiments thereof, it will be understood by those skilled in the art that various changes in form and details may be made therein without departing from the scope of the invention encompassed by the appended claims.

What is claimed is:

1. A method of updating a data record stored in a data store with information supplied by at least one of a plurality of users of a communication network, said data record comprising a first type of information and a second type of information; each of said users having an associated communication identifier, said method comprising:
   obtaining a request from a claiming user to claim the data record, the request including a communication identifier which identifies the claiming user, wherein the claiming user is one of the plurality of users who is asserting editorial privilege on the data record and the communication identifier of the claiming user is not associated with the data record on which the editorial privilege being asserted;
   responsive to the request, upon successful authentication of the claiming user, determining if the data record is unclaimed and if the data record is unclaimed, storing the communication identifier in association with the data record to effectuate the claim by the claiming user to the data record, such that claiming user has control over information contained in the data record;
   based upon the claim by the claiming user, preventing modification of the first type of information by users other than the claiming user and enabling modification of the second type of information by all of said users;
   selectively providing access to the data record according to the claim by the claiming user including:
      receiving information to update the data record provided by a user together with a communication identifier associated with the user providing the information; and
      comparing the communication identifier corresponding to the claim to the data record to the communication identifier associated with the user providing the information including:
      if the information is the first type of information, updating the data record with the information when the identifier associated with the user providing the information is the same as the identifier stored in association with the data record; and
      if the information is the second type of information, updating the data record with the information even if the user providing the information is not the claiming user.

2. A method as claimed in claim 1 wherein the communication identifier associated with the user is authenticated by the communication network when the user logs into the communication network.

3. A method as claimed in claim 1 further comprising creating a data record on the data store responsive to input from one of a plurality of users.

4. A method as claimed in claim 3 wherein the identifier stored in association with the data record is not associated with the user that created the data record.

5. A method as claimed in claim 1 further comprising:
   receiving a request from one of said plurality of users to search the data store, the request including search criteria for the first type of information;
   identifying the data record located based upon the search criteria for the first type of information;
   transmitting at least part of the data record to the one of said plurality of users for display, wherein the part of the data record transmitted comprises the first type and the second type of information.

6. A method as claimed in claim 1 wherein the identifier associated with each user is the login name of the user in the communications network.

7. A method as claimed in claim 1 wherein the first type of information comprises at least one of contact information and keywords.

8. A method as claimed in claim 1 wherein the second type of information comprises at least one of rating information and comments.

9. A communication network device arranged to update a data record with information supplied by at least one of a plurality of users of a communication network, said data record comprising a first type of information and a second type of information the communication network device comprising:
   communication hardware to exchange information with client devices corresponding to the plurality of users; and
   a data store configured to:
      obtain a request from a claiming user to claim the data record, the request including a communication identifier which identifies the claiming user, wherein the claiming user is one of the plurality of who is asserting editorial privilege on the data record and the communication identifier of the claiming user is not associated with the data record on which the editorial privilege being asserted;
      responsive to the request, upon successful authentication of the claiming user, determine if the data record is unclaimed and if the data record is unclaimed, store the communication identifier in association with the data record to effectuate the claim by the claiming user to the data record, such that claiming user has control over information contained in the data record;
      based upon the claim by the claiming user, prevent modification of the first type of information by users other than the claiming user and enable modification of the second type of information by each of said users; and
      selectively control access to access to the data record according to the claim by the claiming user including:
         receiving information to update the data record provided by a user together with a communication identifier associated with the user providing the information;
         comparing the identifier stored in association with the data record to the communication identifier associated with the user providing the information;
         if the information is the first type of information, updating the data record with the information only if the identifier associated with the user providing the information is the same as the identifier stored in association with the data record; and
         if the information is the second type of information the data store is arranged to update the data record with the information even if the user providing the information is not the claiming user.

10. One or more computer readable media other than a signal per se storing instructions that, when executed by a computing system, cause the computing system to perform operations to control access to a data record stored in a data store of a communication network, the operations comprising:

obtaining a request from a claiming user to claim the data record that includes a first type of information and a second type of information, the request including a communication identifier which identifies the claiming user, wherein the claiming user is one of the plurality of who asserts editorial privilege on the data record and the communication identifier of the claiming user is not associated with the data record on which the editorial privilege being asserted;

responsive to the request, upon successful authentication of the claiming user, determining if the data record is unclaimed and if the data record is unclaimed, storing a the communication identifier in association with the data record to effectuate the claim by the claiming user to the data record, such that claiming user has control over information contained in the data record; and based upon the claim by the claiming user, preventing modification of the first type of information by users other than the claiming user and enabling modification of the second type of information by all users by comparing communication identifiers supplied by users attempting to update the data record with the communication identifier stored in association with the data record.

* * * * *